Oct. 20, 1925.
C. J. MELLIN
1,558,034
LOCOMOTIVE DRIVING BOX
Filed Feb. 11, 1924      2 Sheets-Sheet 1
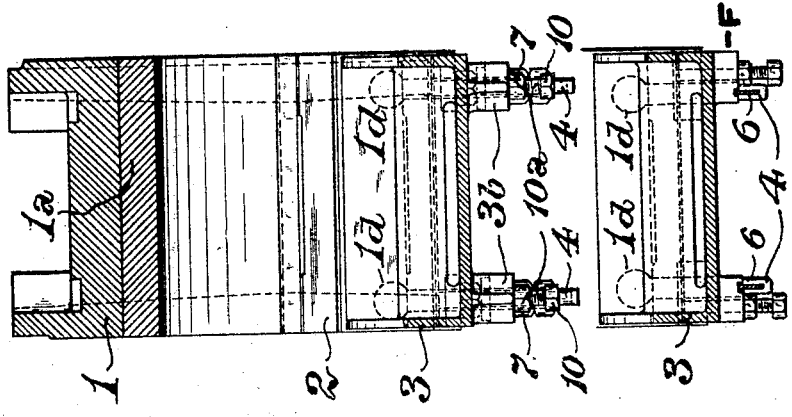
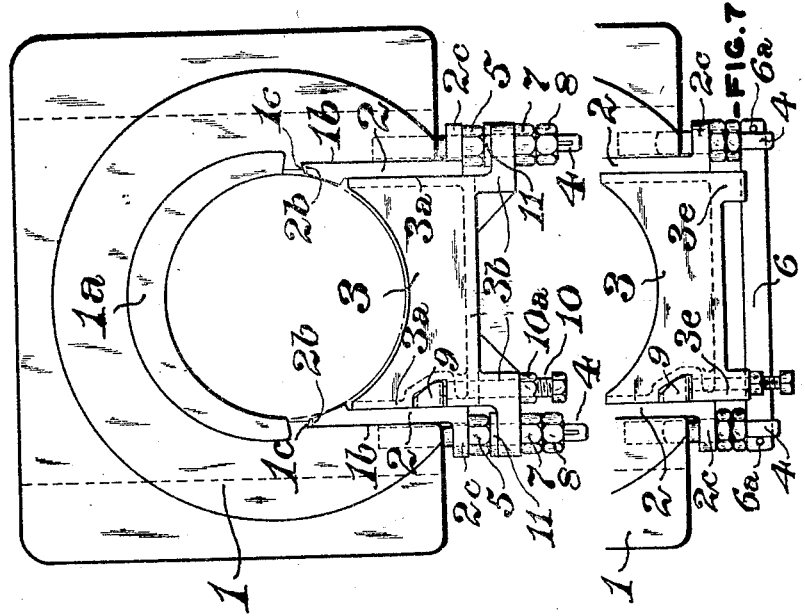

Oct. 20, 1925.  
C. J. MELLIN  
1,558,034  
LOCOMOTIVE DRIVING BOX  
Filed Feb. 11, 1924  2 Sheets-Sheet 2
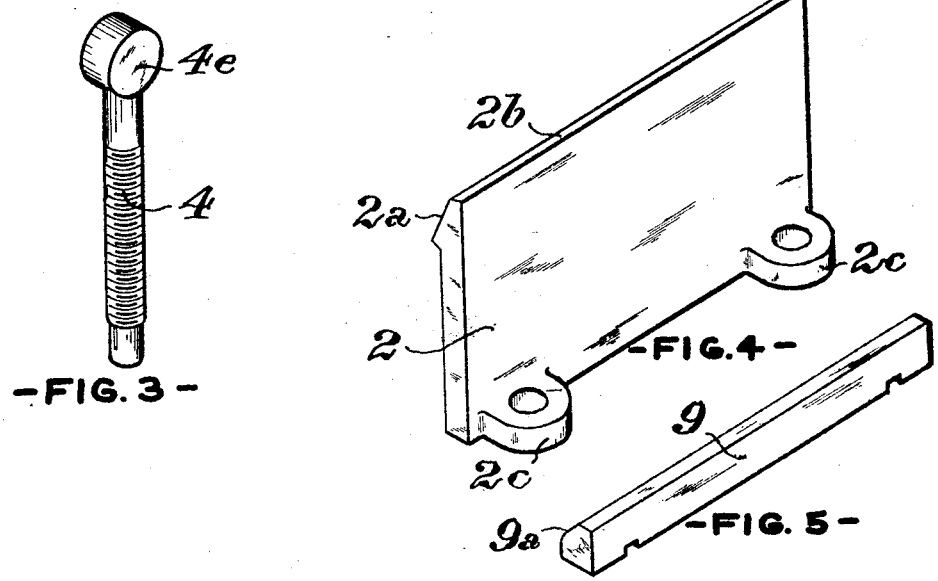
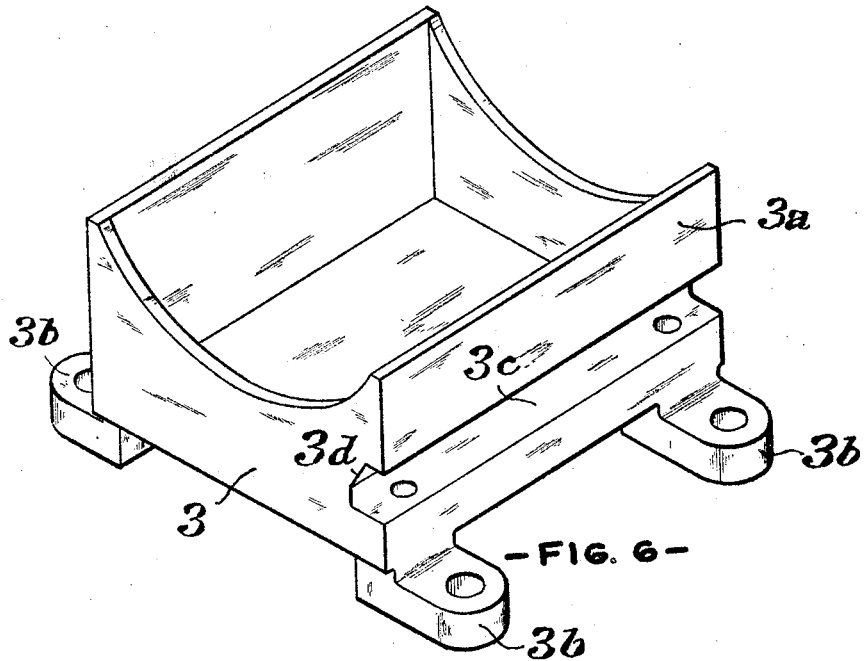
WITNESSES  
INVENTOR Patented Oct. 20, 1925.

1,558,034

UNITED STATES PATENT OFFICE.

CARL J. MELLIN, OF SCHENECTADY, NEW YORK; THE SCHENECTADY TRUST COMPANY EXECUTOR OF SAID CARL J. MELLIN, DECEASED.

LOCOMOTIVE DRIVING BOX.

Application filed February 11, 1924. Serial No. 691,873.

*To all whom it may concern:*

Be it known that I, CARL J. MELLIN, a citizen of the United States, and a resident of Schenectady, in the county of Schenectady and State of New York, have invented a certain new and useful Improvement in Locomotive Driving Boxes, of which improvement the following is a specification.

My invention relates, particularly, to the journal bearings of locomotive driving boxes, and its object is to provide additional bearing surfaces, located below the horizontal plane through the axis of the driving axle, in order to more nearly equalize the projected bearing surface resisting the thrust of the piston, and a lubricant containing cellar, having the capacity of removal without disturbing the supplemental bearing members. A further object is to provide such additional bearing surface members, with adjusting means, operable while the bearing is in place on the axle and so constructed and disposed as to wedge the lubricant cellar in position to form a strut at the bottom of the box, which will obviate any tendency of the side walls of the box to close in on, or cramp, the axle, by reason of excess of load or heating due to journal friction.

The improvement claimed is hereinafter fully set forth.

In the accompanying drawings: Figure 1 is a front view, in elevation, of a locomotive driving box embodying my invention; Fig. 2, a vertical longitudinal central section through the same; Fig. 3, a view, in perspective, of one of the securing bolts; Fig. 4, a similar view of one of the supplemental bearings; Fig. 5, a similar view of a wedge strip, fitted in the cellar to engage the supplemental bearing; Fig. 6, a perspective view of the cellar; Fig. 7, a partial view, similar to Fig. 1, illustrating a structural modification of the means for supporting the cellar; and, Fig. 8, a partial view, similar to Fig. 2, of the same.

In the practice of my invention, referring descriptively to the specific embodiment thereof which is herein exemplified, the driving box, 1, is fitted with a crown brass, $1^a$, in the usual manner, and vertical faces, $1^b$, are machined upon it for the contact of the lateral supplemental bearings, 2. Said bearings, which are most clearly shown in Fig. 4, have concave bearing faces, $2^a$, at their tops, curved to conform to the axle journal on which the driving box is to be placed, and are fitted between the faces, $1^b$, of the driving box, and the vertically machined side faces, $3^a$, of the lubricant cellar, 3. At the top of each of the machined surfaces, $1^b$, an inwardly and downwardly inclined shoulder, $1^c$, is formed in the box, against which shoulder the correspondingly beveled top surface, $2^b$, of the supplemental bearing, 2, fits, and in each of said surfaces, $1^b$, is bored a circular recess, $1^d$, for the reception of the rounded head, $4^e$, of an adjusting bolt, 4. The stems of said bolts extend through apertured lugs, $2^c$, formed on the back of the bearings, 2, at the bottom, as shown in Fig. 4, and are threaded for the reception of nuts, 5, which bear against the underside of the lugs, $2^c$, as best shown in Fig. 1. The bolts, 4, also extend through apertured lugs, $3^b$, on the lubricant cellar, 3, and carry nuts, 7, bearing against the underside of said lugs, and secured in place by lock nuts, 8. One or more spacing washers, 11, may be interposed between the top of the lugs, $3^b$, and the nuts, 5, and, as the journal wears upward into the crown bearing, and, consequently, the contact between the journal and the supplemental bearings is lost, the inclined shoulders, $1^c$, may be trimmed off, to permit said bearings to be drawn up higher in the box.

One of the sides of the cellar, 3, is provided with a longitudinal groove, $3^c$, on the upper part of which there is formed an outwardly and upwardly inclined face, $3^d$. In this groove, there is seated a wedge strip, 9, on the upper portion of the inner side of which there is formed a curved face, $9^a$, to fit against the inclined face, $3^d$, of the groove. The bottom of the wedge strip, 9, is grooved near its ends to receive the ends of set screws, 10, carrying lock nuts, $10^a$, bearing against the undersides of the adjacent lugs, $3^b$, of the lubricant cellar. By tightening up the set screws, 10, the wedge strip, 9, is forced upwardly and at the same time laterally, as will be obvious, pressing the adjacent supplemental bearing directly against the adjacent face, $1^b$, of the box, and the supplemental bearing on the other side, through the cellar, against the other face, $1^b$, of the box. This lateral pressure on the supplemental bearings acts to force the bottom walls of the driving box apart, and resists any tendency of said walls to close in on the journal.

As the journal wears upwardly, into the crown brass, contact between the supplemental bearings and the journal is eliminated, but may be restored by removing metal from the upper bevelled faces, $2^b$, of the supplemental bearings, thus permitting them to be drawn higher up in the box, at the same time making such corresponding adjustment of the thickness of the spacing washers as may become necessary.

As shown in Figs. 7 and 8, which illustrate a structural modification of the means for supporting the cellar, the lugs, $3^b$, are omitted, and in their place the cellar is provided with short downwardly extending lugs, $3^e$, grooved at their bottom to fit over the upper edge of a pair of keys, 6, which are passed through slots formed in the lower ends of the bolts, 4, and are secured in place by cotter pins, $6^a$.

It will be seen that my invention is readily applicable, at comparatively slight cost, in connection with driving boxes of the present standard construction, and also that it attains, in practice, the important advantage of enabling any and all adjustments to be effected while the axle is in place, and, when adjusted, obviates tendency to cramp or bind the axle. It will also be seen that the removal and replacement of the lubricant cellar may be effected, as desired, without interference with the supplemental bearings.

I claim as my invention and desire to secure by Letters Patent:

1. The combination of a locomotive driving box; a crown brass therein; supplemental bearings, slidable on the vertical inner faces of the driving box, below its horizontal axial plane; and adjusting means, comprising bolts, the heads of which are seated in recesses in the said faces of the box, and the bodies of which pass through outwardly projecting lugs on the sides of the supplemental bearings.

2. The combination of a locomotive driving box; a crown brass therein; vertical machined inner recessed faces on the driving box, below the crown brass; inwardly projecting shoulders at the tops of said faces; supplemental bearings, slidable on said faces, and adapted to engage said shoulders; and means held in said recesses and engaging lugs on said supplemental bearings for adjusting the same vertically.

3. The combination of a locomotive driving box; a crown brass therein; supplemental bearings, slidable on the vertical inner faces of the driving box below its horizontal axial plane; means for adjusting said supplemental bearings to take up wear; a lubricant cellar, having vertical sides, fitting between said supplemental bearings; a wedge strip fitted in a groove in one side of the cellar and bearing against the adjacent supplemental bearing; and means for actuating said wedge strip to exert opposed pressure on the cellar and said supplemental bearings.

4. The combination of a locomotive driving box; a crown brass therein; lateral vertically slidable supplemental bearings, adapted to engage the journal below its axis; a lubricant cellar, fitted between said supplemental bearings; a wedge strip, seated in a horizontal groove, on one side of the cellar, having an inclined inner face, and bearing against the adjacent supplemental bearing; and a set screw for forcing said wedge strip upwardly and outwardly, whereby closing in of the lower sides of the driving box is prevented.

5. The combination of a locomotive driving box; a crown brass therein; plates, the upper parts of which constitute supplemental bearings for the lower part of the journal, and which are slidably fitted on the inner vertical faces of the driving box side walls; lugs on the lower ends of said supplemental bearings; bolts, held in the driving box side walls, and passed through said lugs, the lower ends of said bolts being slotted; keys, passing through the slots of the bolts; a lubricant cellar, supported by said keys; means for adjusting the supplemental bearings vertically; and means, coacting with the cellar, for pressing the supplemental bearings against the inner faces of the driving box.

CARL J. MELLIN.